US008131620B1

(12) United States Patent
Steinberg et al.

(10) Patent No.: US 8,131,620 B1
(45) Date of Patent: Mar. 6, 2012

(54) FINANCIAL INSTRUMENT SELECTION AND WEIGHTING SYSTEM AND METHOD

(75) Inventors: Jonathan L. Steinberg, New York, NY (US); Luciano Siracusano, III, New York, NY (US)

(73) Assignee: WisdomTree Investments, Inc., New York, NY (US)

( * ) Notice: Subject to any disclaimer, the term of this patent is extended or adjusted under 35 U.S.C. 154(b) by 475 days.

(21) Appl. No.: 11/062,033

(22) Filed: Feb. 18, 2005

Related U.S. Application Data (63) Continuation-in-part of application No. 11/001,894, filed on Dec. 1, 2004.

(51) Int. Cl.
 *G06Q 40/00* (2006.01)
(52) U.S. Cl. ...................................... 705/36 R
(58) Field of Classification Search .................. 705/35, 705/36 R
 See application file for complete search history.

(56) References Cited

U.S. PATENT DOCUMENTS

| | | | |
|---|---|---|---|
| 5,126,936 A | 6/1992 | Champion et al. |
| 5,132,899 A | 7/1992 | Fox |
| 5,220,500 A | 6/1993 | Baird et al. |
| 5,761,442 A | 6/1998 | Barr et al. |
| 5,806,048 A | 9/1998 | Kiron et al. |
| 5,819,238 A | 10/1998 | Fernholz |
| 5,946,667 A | 8/1999 | Tull et al. |
| 5,978,778 A | 11/1999 | O'Shaughnessy |
| 6,003,018 A | 12/1999 | Michaud et al. |
| 6,061,663 A | 5/2000 | Bloom et al. |
| 6,064,985 A | 5/2000 | Anderson |
| 6,088,685 A | 7/2000 | Kiron et al. |
| 6,175,824 B1 | 1/2001 | Breitzman et al. |
| 6,247,001 B1 | 6/2001 | Tresp et al. |
| 6,317,726 B1 | 11/2001 | O'Shaughnessy |
| 6,484,152 B1 | 11/2002 | Robinson |
| 6,601,044 B1 | 7/2003 | Wallman |
| 6,622,129 B1 | 9/2003 | Whitworth |
| 6,839,685 B1 | 1/2005 | Leistensnider et al. |
| 6,901,383 B1 | 5/2005 | Ricketts et al. |
| 6,920,432 B1 | 7/2005 | Carey |
| 6,928,418 B2 | 8/2005 | Michaud et al. |
| 6,938,009 B1 | 8/2005 | Herbst et al. |

(Continued)

FOREIGN PATENT DOCUMENTS

EP 1351179 10/2003

(Continued)

OTHER PUBLICATIONS

"Index" and "Stock Indices". Barron's Dictionary of Finance and Investment Terms, 6th Edition, 2003.*

(Continued)

*Primary Examiner* — Olabode Akintola
(74) *Attorney, Agent, or Firm* — Dorsey & Whitney LLP (57) ABSTRACT

A financial instrument formed by selecting and weighting securities according to selection and weighting criteria. A primary index may be constructed from a universe of securities meeting at least one selection criterion, and may optionally be weighted according to a selection criterion. Derivative indices may be constructed from the primary index. The derivative indices may be further screened and/or weighted according to the same or different selection criteria. Derivative indices may also be created from other derivative indices, again based on selection and/or weighting criteria. The primary index and any derivative indices may be ranked according to one or more selection criteria, either before or after derivative indices are constructed.

21 Claims, 2 Drawing Sheets

U.S. PATENT DOCUMENTS

| | | |
|---|---|---|
| 6,947,901 B1 | 9/2005 | McCabe et al. |
| 7,024,388 B2 | 4/2006 | Stefek et al. |
| 7,050,998 B1 | 5/2006 | Kale et al. |
| 7,085,738 B2 | 8/2006 | Tarrant |
| 7,089,205 B1 | 8/2006 | Abernethy |
| 7,099,838 B1 | 8/2006 | Gastineau et al. |
| 7,206,760 B1 | 4/2007 | Carey et al. |
| 7,251,627 B1 | 7/2007 | Vass |
| 7,305,362 B2 | 12/2007 | Weber et al. |
| 7,412,414 B2 | 8/2008 | Michaud et al. |
| 7,571,130 B2 | 8/2009 | Weber |
| 7,571,134 B1 | 8/2009 | Burns |
| 7,742,969 B2 | 6/2010 | Teague et al. |
| 7,885,885 B1 | 2/2011 | Strongin, II et al. |
| 8,024,217 B2 | 9/2011 | Sadre |
| 8,024,258 B2 | 9/2011 | Gastineau et al. |
| 2002/0003729 A1 | 1/2002 | Uchihashi |
| 2002/0007329 A1 | 1/2002 | Alcaly et al. |
| 2002/0007332 A1 | 1/2002 | Johnson et al. |
| 2002/0032629 A1 | 3/2002 | Siegel et al. |
| 2002/0038271 A1 | 3/2002 | Friend et al. |
| 2002/0052820 A1 | 5/2002 | Gatto |
| 2002/0059126 A1 | 5/2002 | Ricciardi |
| 2002/0062272 A1 | 5/2002 | Kim et al. |
| 2002/0116310 A1 | 8/2002 | Cohen et al. |
| 2002/0123952 A1 | 9/2002 | Lipper |
| 2002/0133447 A1 | 9/2002 | Mastman |
| 2002/0174047 A1 | 11/2002 | Fernholz |
| 2003/0014343 A1 | 1/2003 | Jones |
| 2003/0018570 A1 | 1/2003 | McCabe et al. |
| 2003/0036989 A1 | 2/2003 | Bhatia |
| 2003/0046215 A1 | 3/2003 | Teague et al. |
| 2003/0061169 A1 | 3/2003 | Long, III et al. |
| 2003/0065599 A1 | 4/2003 | Huang |
| 2003/0065600 A1 | 4/2003 | Terashima et al. |
| 2003/0065602 A1 | 4/2003 | Yip |
| 2003/0065604 A1 | 4/2003 | Gatto |
| 2003/0065605 A1 | 4/2003 | Gatto |
| 2003/0074306 A1 | 4/2003 | Rios et al. |
| 2003/0093352 A1 | 5/2003 | Muralidkar et al. |
| 2003/0182219 A1 | 9/2003 | Bodurtha et al. |
| 2003/0191704 A1 | 10/2003 | Alb |
| 2003/0212621 A1 | 11/2003 | Poulter et al. |
| 2004/0044505 A1 | 3/2004 | Horwitz |
| 2004/0049448 A1* | 3/2004 | Glickman ............... 705/37 |
| 2004/0068456 A1 | 4/2004 | Korisch |
| 2004/0083150 A1 | 4/2004 | Michaud et al. |
| 2004/0083151 A1 | 4/2004 | Craig et al. |
| 2004/0093294 A1 | 5/2004 | Trevino |
| 2004/0117284 A1* | 6/2004 | Speth ............... 705/36 |
| 2004/0139031 A1* | 7/2004 | Amaitis et al. ............... 705/80 |
| 2004/0181477 A1 | 9/2004 | Sauter et al. |
| 2004/0236661 A1 | 11/2004 | Benning |
| 2004/0267657 A1 | 12/2004 | Hecht |
| 2005/0010481 A1 | 1/2005 | Lutnick et al. |
| 2005/0015326 A1 | 1/2005 | Terry |
| 2005/0033679 A1 | 2/2005 | Rachev et al. |
| 2005/0038725 A1 | 2/2005 | Boyle et al. |
| 2005/0049952 A1 | 3/2005 | Carter |
| 2005/0114251 A1 | 5/2005 | Sperandeo |
| 2005/0149422 A1 | 7/2005 | Van Lier |
| 2005/0171884 A1 | 8/2005 | Arnott |
| 2005/0246255 A1 | 11/2005 | Rousseau et al. |
| 2006/0015433 A1 | 1/2006 | Arnott |
| 2006/0059074 A1 | 3/2006 | Freund |
| 2006/0064364 A1 | 3/2006 | Whitehead |
| 2006/0100950 A1 | 5/2006 | Hecht |
| 2006/0149645 A1 | 7/2006 | Wood |
| 2006/0161489 A1 | 7/2006 | Allen et al. |
| 2006/0184438 A1 | 8/2006 | McDow |
| 2006/0190371 A1 | 8/2006 | Almgren et al. |
| 2006/0200395 A1 | 9/2006 | Masuyama et al. |
| 2006/0224487 A1 | 10/2006 | Galdi |
| 2006/0224494 A1 | 10/2006 | Pinkava |
| 2006/0253376 A1 | 11/2006 | Seale et al. |
| 2007/0055598 A1 | 3/2007 | Arnott |
| 2007/0112657 A1 | 5/2007 | Huber |
| 2007/0265952 A1 | 11/2007 | Kridel |
| 2008/0109377 A1 | 5/2008 | Haig |
| 2008/0313100 A1 | 12/2008 | Weber et al. |
| 2009/0006274 A1 | 1/2009 | Levin et al. |

FOREIGN PATENT DOCUMENTS

| | | |
|---|---|---|
| GB | 2393532 | 3/2004 |
| GB | 2419011 | 4/2006 |
| JP | 2001/249962 | 9/2001 |
| JP | 2003/044664 | 2/2003 |
| JP | 2004/259156 | 9/2004 |
| WO | WO96/06402 | 2/1996 |
| WO | WO01/33402 | 5/2001 |
| WO | WO01/37168 | 5/2001 |
| WO | WO01/39005 | 5/2001 |
| WO | WO02/093322 | 11/2002 |
| WO | WO02/095639 | 11/2002 |
| WO | WO03/009094 | 1/2003 |
| WO | WO2005/076812 | 8/2005 |
| WO | WO2006/089565 | 8/2006 |
| WO | WO2006/103474 | 10/2006 |

OTHER PUBLICATIONS

Dow Jones Indexes Factsheets for Dow Jones U.S. Total Martket Index and Dow Jones U.S. Select Dividend Index. p. 1-10. Sep. 29, 2006.*

Maurer, R. et al., "Characteristics of German Real Estate Return Distribution: Evidence from Germany and Comparison to the U.S and U.K", JREPM, Boston, Jan.-Apr. 2004.*

Dow Jones Indexes Factsheets for Dow Jones U.S. Total Martket Index and Dow Jones U.S. Select Dividend Index. p. 1-10. Sep. 29, 2006.*

Maurer, R. et al., "Characteristics of German Real Estate Return Distribution: Evidence from Germany and Comparison to the U.S and U.K", JREPM, Boston, Jan.-Apr. 2004.*

Arnott et al., "Redefining Indexation", Research Affiliates, LLC, 39 pages, 2004.

Author Unknown, "Dow Jones Indexes: Dow Jones Select Dividend Index Summary", Dow Jones & Company, Inc., South Brunswick, New Jersey, 5 pages, 2003.

Author Unknown, "Dow Jones Select Dividend Index", Dow Jones Indexes, 2 pages, Dec. 20, 2004.

Author Unknown, Example from Korea Dividend Index, 1 page, at least as early as Apr. 19, 2005.

Author Unknown, example papers from Dow Jones Select Dividend Index, 6 pages, at least as early as Apr. 19, 2005.

Author Unknown, "Float Adjustment", Standard & Poor's, The McGraw-Hill Companies, 6 pages, Sep. 28, 2004.

Author Unknown, "FTSE Xinhua Index Launches China High Yield Index", http://www.prnewswire.com/cgi-bin/stories, 2 pages, Apr. 18, 2005.

Author Unknown, New Dividend Achievers Index Announced by Mergent, Inc., http://www.mergent.com/publish/DividendAchierMediaDetail193.asp, 2 pages, Dec. 8, 2003.

Author Unknown, "Powershares High Yield Equity Dividend Achievers Portfolio", PowerShares Exchange-Traded Fund Trust, pp. 13-14, Dec. 9, 2004.

Author Unknown, "Pressroom: Dow Jones Indexes to Launch Dividend Index", http://www.dowjones.com/Pressroom/PressRelaeases, Oct. 30, 2003.

Author Unknown, "Russell US Equity Indexes: Index Construction and Methodology", Russell Indexes, 23 pages, Feb. 2004.

Author Unknown, "S&P Global Indices Methodology: The Gauge of the Market Economy", Standard & Poor's, The McGraw-Hill Companies, 25 pages, May 18, 2004.

Author Unknown, "S&P U.S. Indices Methodology", Standard & Poor's, The McGraw-Hill Companies, 8 pages, Sep. 28, 2004.

Author Unknown, "Shanghai to Issue dividend index", http://en.ce.cn/Markets/Equities/200501/04/t20050104_2746206.shtml, 1 page, Jan. 4, 2005.

Author Unknown, "STOXX Ltd. To License Pan-European Select Dividend and Broad European Indexes to Indexchange", http://biz/yahoo.com, 2 pages, Apr. 11, 2005.

Bryson, Anke, "Chasing dividends", http://www.faz.net, 1 page, Mar. 4, 2005.

Coggan, Philip, "Breaking down the pension benchmarks", http://financialtimes.printthis.clickability.com, 1 pages, Mar. 6, 2003.

Hulbert, Mark, "Why Your Stock Index Fund is Lagging the Markeet", The New York Times Company, 3 pages, Nov. 7, 2004.

Wood et al., "Fundamental Profit-Based Equity Indexation: A Better Way to Hold the Market", Journal of Indexes, Second Quarter, 8 pages; 2003.

Arnott et al., "Fundamental Indexation", Financial Analysts Journal, vol. 61, No. 2, 83-99, Mar./Apr. 2005 (at www.cfapubs.org).

Arnott et al., "Fundamental Indexation", Financial Analysts Journal, vol. 61, No. 2, pp. 83 and 98, Mar./Apr. 2005 (at www.cfapubs.org).

Arnott et al., "Redefining Indexation", Research Affiliates, LLC, pp. 1-24, 2004.

Arnott et al., "Surprise! Higher Dividends = Higher Earnings Growth", Financial Analysts Journal, pp. 70-72 and 82, Jan./Feb. 2003.

Author Unknown, "About the America's Fastest Growing Companies$^{SM}$ Family of Stock Indexes", America's Fastest Growing Companies, 2 pages, at least as early as Jan. 24, 2002 (at http://www.afgc.com/).

Author Unknown, "America's Fastest Growing Companies$^{SM}$ Index", America's Fastest Growing Companies, 2 pages, at least as early as Jan. 24, 2002 (at http://www.afgc.com/).

Author Unknown, "America's Fastest Growing Companies$^{SM}$ LargeCap Index", America's Fastest Growing Companies, 2 pages, at least as early as Jan. 24, 2002 (at http://www.afgc.com/).

Author Unknown, "America's Fastest Growing Companies$^{SM}$ Midcap Index", America's Fastest Growing Companies, 3 pages, at least as early as Jan. 24, 2002 (at http://www.afgc.com/).

Author Unknown, "America's Fastest Growing Companies$^{SM}$ Total Growth Index", America's Fastest Growing Companies, 2 pages, at least as early as Jan. 24, 2002 (at http://www.afgc.com/).

Author Unknown, "CME: Goldman Sachs Commodity Index (GSCI) revises commodity weights for 2003", 1 page, Nov. 6, 2002.

Author Unknown, "CME: Goldman Sachs Commodity Index (GSCI) to include CME Feeder Cattle in 2002 Index Weighting", 1 page, Nov. 7, 2001.

Author Unknown, "Dow Jones Indexes: Dow Jones Select Dividend Index Summary", 5 pages, at least as early as Sep. 30, 2003.

Author Unknown, "Dow Jones Indexes to Launch Dividend Index", 2 pages, Oct. 30, 2003 (at http://www.dowjones.com/cgi-bin/).

Author Unknown, "MSCI Methodology Book: MSCI Global Value and Growth Index Series", Morgan Stanley Capital International Inc., pp. 1, 2 and 8-11, 2003.

Author Unknown, "MSCI Press Release: MSCI Develops Enhanced Methodology for its Global Value and Growth Indices", 2 pages, Sep. 25, 2002 (at http://www.msci.com).

Author Unknown, "Registration Statement for iShares (R) Trust", pp. 1, 2, 4, 5, 8, 14 and 15 of 67, Aug. 18, 2003 (at http://www.sec.gov/Archives/edgar/data/).

Block, Sandra, "Stock Funds to Go Gourmet to Beat Index", USA Today, Section Money, 2 pages, Mar. 3, 1997.

Buffet, Warren, Letter to Berkshire Hathaway, Inc. Shareholders, pp. 3, 16 and 19, at least as early at 1999.

Fama, Eugene, Jr., "The New Indexing", 2 pages, Jul. 2000 (at http://www.dfaus.com/).

Wood et al., "Fundamental Profit Based Equity Indexation: A Better Way to Hold the Market", 5 pages, Second Quarter 2003 (at http://www.journalofindexes.com).

Author Unknown, "Safian Market Benchmark", Safian Investment Research, Inc., White Plains, New York, 22 pages, Jan. 8, 2004.

Author Unknown, "Building Portfolios without Prices", FTSE Global Markets, pp. 78-80, Nov./Dec. 2005.

Chernoff, Joel, "A new look in benchmarks," Pensions & Investments, vol. 25, Issue 8, http://proxy.library.upenn.edu:8130/login.aspx?direct=true&db=buh&an=9704256720, 3 pages, Apr. 14, 1997.

Author Unknown, "Standard & Poors Float Adjustment," Sep. 28, 2004; no author listed but David Blitzer and Dave Guarino are contacts Richards, Thomas M., "Alternatives to Broad Market indexes," www.aimr.org, pp. 13-20, 2001.

Arnott, Robert and David Hennessy, "Research Affiliates Fundamental Index," Feb. 2006, 24 pages.

Arnott, Robert D., "What Cost "Noise"?", Financial Analysts Journal, Editor's Corner, CFA Institute, Mar./Apr. 2005, pp. 10-14 [p. 13 intentionally skipped].

Arnott, Robert, "Retrospectives on Selected Fundamental Index Strategies," Research Affiliates, Dec. 2005, 16 pages.

Author Unknown, "CalPERS Goes Fundamental," News, Indexing Developments, Journal of Indexes, May/Jun. 2006, p. 52.

Author Unknown, "Dividend Party Goes Global," Journal of Indexes, Mar./Apr. 2006, p. 52.

Author Unknown, "FTSE/RAFI PowerShares ETF Launches on Big Board," Journal of Indexes, Mar./Apr. 2006, pp. 51-52.

Author Unknown, "Index Industry Leaders . . . In Their Own Words," Journal of Indexes, Sep./Oct. 2006, pp. 10-21 [p. 19 intentionally skipped].

Author Unknown, "Methodology for the Management of the FTSE RAFI (Research Affiliates Fundamental Index) Index Series," The FTSE RAFI Index Series Ground Rules, Version 1.1, Dec. 2005, 11 pages.

Author Unknown, "Optimal Value-Weighted Portfolios," Economist's View: Value Weighted Portfolios, Jun. 14, 2006, 3 pages.

Author Unknown, "PowerShares Exchange-Traded Fund Trust," PowerShares FTSE RAFI US 1000 Portfolio-PRF, Prospectus Supplement dated Feb. 22, 2006, Prospectus dated Dec. 19, 2005, 28 pages.

Author Unknown, "PowerShares FTSE RAFI US 1000 Portfolio," www.powershares.com, PRF Facts, Sep. 30, 2005, 2 pages.

Author Unknown, "Stock Market Perspective: Better Ways to Index?", http://www.pankin.com/persp062.pdf, 3 pages.

Author Unknown, "William F. Sharpe Awards—Plus Editorial Board Meeting Excerpts," Journal of Indexes, Mar./Apr. 2006, pp. 36-41.

Blanchett, David, "Building the Best Index; Equal-Weighting vs. Market Capitalization," Journal of Indexes, Jan./Feb. 2006, pp. 40-42.

Burns, Scott, "Next-Generation Index Funds Coming," Dallas Morning News, Nov. 26, 2004, 2 pages.

Gastineau, Gary, "Is Indexing Ready for the Challenges of the $21^{st}$ Century?", Journal of Indexes, The Cutting Edge, Mar./Apr. 2006, pp. 32-35.

Hsu, Jason C. and Carmen Campollo, "New Frontiers in Index Investing," Journal of Indexes, Jan./Feb. 2006, pp. 32-34, 36, 37 and 58.

Leake, Thomas and David Morris, "Where Next for the Index Business Model" Bringing Low Cost to the World of Active Management, Journal of Indexes, May/Jun. 2006, pp. 22-26.

Makepeace, Mark, "FTSE: Coming to America," Journal of Indexes, Jan./Feb. 2006, pp. 38-39.

Markowitz, Harry M., "Market Efficiency: A Theoretical Distinction and So What?", www.cfapubs.org, Financial Analysts Journal, Reflections, CFA Institute, Sep./Oct. 2005, pp. 17-30.

Raub, David, "Rethinking Indexing," www.NorthBaybiz.com, Apr. 2006, 2 pages.

Schoenfeld, Steven A. and Robert E. Ginis, "Worth Weighting for? A Survey and Critique of Alternatively Weighted Indexes," Journal of Indexes, May/Jun. 2006, pp. 10-21.

Serwer, Andy, "Brains, Pluck, and Bucks," CNNMoney.com/magazines/fortunte/fortune_archives, Jul. 3, 2006, 3 pages.

Treynor, Jack, "Perspectives: Why Market-Valuation-Indifferent Indexing Works," Financial Analysts Journal, vol. 61, No. 5, CFA Institute, Sep./Oct. 2005, pp. 65-69.

Wooley, Scott, "The Index Insurgents," Forbes.com, Magazine article, Oct. 30, 2006, 3 pages.

Office Action dated Jun. 22, 2010, U.S. Appl. No. 11/001,894, 14 pages.

Amendment and Response to Office Action dated Jul. 7, 2010, U.S. Appl. No. 11/457,402, 10 pages.

Amendment and Response to Office Action dated Dec. 22, 2010, U.S. Appl. No. 11/001,894, 12 pages.

Office Action dated Feb. 11, 2011, U.S. Appl. No. 11/001,894, 12 pages.

Amendment and Response to Office Action dated Jul. 11, 2011, U.S. Appl. No. 11/001,894, 13 pages.

Final Office Action dated Oct. 7, 2010, U.S. Appl. No. 11/457,402, 14 pages.
Request for Continued Examination and Amendment and Response to Final Office Action dated Feb. 2, 2011, U.S. Appl. No. 11/457,402, 15 pages.
Office Action dated Aug. 4, 2011, U.S. Appl. No. 11/457,402, 14 pages.
Final Office Action dated Aug. 11, 2011, U.S. Appl. No. 11/001,894, 15 pages.
Amendment and Response to Final Office Action dated Nov. 11, 2011, U.S. Appl. No. 11/001,894, 13 pages.
Amendment and Response to Office Action dated Nov. 4, 2011, U.S. Appl. No. 11/457,402, 13 pages.
Office Action dated Nov. 22, 2011, U.S. Appl. No. 11/001,894, 13 pages.
Office Action dated Jan. 6, 2012, U.S. Appl. No. 11/457,402, 16 pages.

* cited by examiner

FINANCIAL INSTRUMENT SELECTION AND WEIGHTING SYSTEM AND METHOD

CROSS-REFERENCE TO RELATED APPLICATIONS

This application claims priority to and is a continuation-in-part of U.S. utility application Ser. No. 11/001,894, entitled "FINANCIAL INSTRUMENT WEIGHTING SYSTEM AND METHOD" and filed on Dec. 1, 2004, which is incorporated in its entirety as if fully set forth herein.

BACKGROUND OF THE INVENTION

1. Technical Field

This invention relates generally to a method and system for selecting weighting components of a financial instrument, and more specifically to methods and apparatuses for selecting and weighting components of a financial instrument by revenue or dividends.

2. Discussion of Background Art

Ever since the first stocks were traded on Wall Street in the 1700s, securities brokering has become ever more complicated. The rise of the New York Stock Exchange in 1817 began the formalization of purchases and sales, setting down rules of business. Dating back to these times, traders have attempted to maximize profit on securities trades and brokering.

One relatively common method for maximizing trading profits is the creation of a financial instrument, such as an index or fund. Different, financial instruments may track, represent, and/or include different securities. For example, a small-cap index generally tracks stocks issued by companies having a market capitalization of $250 million to $1 billion. Similarly, certain funds may hold bonds, private equity, public equity, both private and public equity (as in the case of a crossover fund), securities linked to a certain geographic region (i.e., a "regional fund"), securities sharing certain market characteristics (i.e., a "sector fund"), and so forth.

Although various methods for creating and tracking financial instruments exist, many methods for creating and/or weighting financial instruments have been ignored. "Weighting" generally refers to the process of adding certain securities to a financial instrument in amounts corresponding to the relative presence or value of a fundamental datum shared by all securities in the fund universe. Similarly, many different selection criterion for including securities in a financial instrument have yet to be explored. Thus, several strategies for maximizing profit in an open trading forum have not been exploited.

Further, the creation and tracking of financial instruments often does not take dividend payments into account, or does not provide a benchmark to measure the relative value of dividend-paying securities. This is true not only for securities traded or available in the United States, but also those traded or available in other geographic regions such as Europe, Japan, Hong Kong, and so forth. Creation of a financial instrument capable of tracking dividend payments and being weighted accordingly may facilitate the review and understanding of the benefits provided by dividend-paying securities, and may create investment vehicles that generate superior returns, with lower volatility, when compared to funds based on established market-capitalization weighted benchmark indices.

Accordingly, there is a need in the art for an improved financial instrument and method for creating the same. The advantages and benefits of the present invention will be apparent upon reading the following summary and detailed description of the invention.

BRIEF SUMMARY OF THE INVENTION

Generally, one embodiment of the present invention takes the form of a financial instrument made of securities selection according to one or more selection criteria. The financial instrument, may take the form of a first index having a first and second security, the first and second security having a positive dividend yield, the first security issued by a first affiliated entity, and including a first fundamental datum satisfying a first selection criterion, the second security issued by a second affiliated entity, the second security including a second fundamental datum satisfying the first selection criterion, wherein the first and second securities are ranked within the index according to the first selection criterion. The financial instrument may include additional derivative indices derived from the first index.

The derivative indices are generally subsets of the securities contained in the first index, and may be chosen to satisfy additional selection criteria. For example, one derivative index may consist of high-yield securities, while another consists of large market-capitalization securities. Still other derivative indices may be selected from the first index, in accordance with the methodologies described herein.

The first index may also be referred to as a "primary index" or "universe."

Selection criteria for screening securities in the primary or derivative indices may include, for example, a non-zero dividend yield, a minimum affiliated entity market capitalization, a minimum total cash dividends paid over a period of time, and so forth. The securities may be common stock, real estate investment trusts (REITS), tracking stocks trading on a specified stock exchange, and/so forth.

The financial instrument, such as an index or a fund, may be weighted by calculating a weighting percentage for each security, where the weighting percentage for the first security is based on one of the fundamental data employed for selection, or another fundamental datum; the weighting percentage for the second security may be similarly determined. The aforementioned first weighting percentage may equal the amount of the first security represented in the weighted financial instrument, and the aforementioned second weighting percentage may equal the amount of the second security represented in the weighted financial instrument. In a specific embodiment, the present invention may take the form of an index containing one or more stocks, where each stock is present in the index in a percentage equal to its weighting factor divided by the sum of all weighting factors for every stock in the index. In yet another embodiment, the present invention may take the form of an index containing one or more stocks, where each stock is present in the index in a percentage equal to the product of its weighting factor times the number of outstanding common or free-float shares, divided by the sum of every product of each stock's weighting factor and the number of shares outstanding of the stock.

In a further embodiment of the invention, a weighted financial instrument may be derived from a previously-devised primary financial instrument, wherein the securities included in the weighted financial instrument comprise a subset of the securities of the primary financial instrument. In one embodiment, the securities held in the financial instrument may include a particular number or percentage of the primary financial instrument securities, ranked according to a selection criterion. In another embodiment, the securities held in the financial instrument may include the securities of the primary financial instrument which satisfy a particular value of selection criterion.

Another embodiment of the present invention takes the form of a method for selecting and weighting securities for inclusion in a financial instrument, including the operations of: selecting a universe of securities satisfying a first and second selection criterion; ranking the universe of securities by the first selection criterion; wherein the first selection criterion is a minimum market capitalization; the second selection criterion is a positive dividend yield; and each of the plurality of securities is associated with an affiliated entity. Each security in the universe may be weighted, such that each security occupies a percentage of the universe equal to a weighting percentage unique to that security. Each security's weighting percentage may be calculated in a variety of manners. For example, a weighting percentage for a security may be calculated by multiplying a cash dividend per share times a number of outstanding shares of the security to yield an indicated cash dividend (or indicated dividend stream). The indicated cash dividend for every security in the index may be summed to yield an indicated aggregate dividend. Next, the indicated cash dividend for a given security may be divided by the indicated aggregate dividend to yield a weighting percentage. The given security occupies a percentage of the index equal to the weighting percentage for that security, at or around a time of an annual reconstitution. Weighting percentages may be calculated for each security in the index, and each security is generally present in the index in a percentage equal to that security's weighting percentage.

As used herein, the term "affiliated company" generally refers to a company issuing, backing, or otherwise securing a security.

DETAILED DESCRIPTION OF THE INVENTION

Generally, one embodiment of the present invention takes the form of an index or (other financial instrument) made of at least two securities. The securities are weighted by some form of fundamental data, such as revenue (also referred to as "sales") or dividends paid on the security. "Weighting" generally refers to determining an amount of a security to be held in the index by, for example, specifying the relative importance of a security based on a given variable. For example, in a stock-based, market-capitalization weighted index, each included stock affects the index in proportion to the number of shares of the stock outstanding multiplied by the stock's price.

For reference, the term "index" generally refers to a statistical indicator which provides a representation of the value of the securities which constitute the indicator. Indices may, for example, serve as barometers for a given market or industry and benchmarks against which financial or economic performance is measured. The value of any given index may be arbitrarily set, just as the total shares of all securities in the index may be arbitrary. For ease and clarity throughout this document, however, the present embodiment presumes the value of the subject index equals 100.

Also for reference, the term "dividend" may refer to either a net dividend or gross dividend. Accordingly, dividend-weighted indices, as discussed herein, may be weighted using either net or gross dividends. Further, the type of dividend may vary depending on the geographic location in which a security is traded or reported. For example, dividend-weighted indices employing securities traded in North America or Japan may be gross dividend-weighted, while indices employing securities traded in Europe may be net dividend-weighted.

Similarly, the term "fundamental data" generally refers to any factor that may be considered important to the understanding of a particular business, and may be directly numerically measured. Typically, such fundamentals are considered outside the context of the market as a whole, and are accordingly market invariant. Some examples of fundamentals include growth, revenues, earnings, dividends, profits, and so forth. Fundamental data may be a function of a security, such as a dividend or growth rate, or may be a function of an entity issuing, backing, or otherwise associated with a security (collectively, an "affiliated entity"), such as corporate revenue, location of business incorporation, number of corporate employees, market capitalization, and so forth.

As used herein, the term "security" generally refers to an investment instrument issued by a government, corporation, or other entity, evincing a debt or equity. This term explicitly embraces the definition of the Securities Act of 1934, which follows: "Any note, stock, treasury stock, bond, debenture, certificate of interest or participation in any profit-sharing agreement or in any oil, gas, or other mineral royalty or lease, any collateral trust certificate, preorganization certificate or subscription, transferable share, investment contract, voting-trust certificate, certificate of deposit, for a security, any put, call, straddle, option, or privilege on any security, certificate of deposit, or group or index of securities (including any interest therein or based on the value thereof), or any put, call, straddle, option, or privilege entered into on a national securities exchange relating to foreign currency, or in general, any instrument commonly known as a 'security;' or any certificate of interest or participation in, temporary or interim certificate for, receipt for, or warrant or right to subscribe to or purchase, any of the foregoing; but shall not include currency or any note, draft, bill of exchange, or banker's acceptance which has a maturity at the time of issuance of not exceeding nine months, exclusive of days of grace, or any renewal thereof the maturity of which is likewise limited."

Additionally, financial instruments other than indices may be weighted. A variety of financial or investment products may be weighted according to the methods and procedures disclosed herein, such as closed-end or open-end registered or unregistered investment companies or commodity pools, securities thereof and/or interests therein, and options and futures on any such product.

Weighting Factors and Selection Criteria

Many different types of securities may be represented in a financial instrument, such as an index or fund. Further, amongst the different security types, some securities may be more desirable (or otherwise preferred) for inclusion or representation in a financial instrument than others. For example, while stocks are one example of a security, a fund may hold only dividend-paying stocks. As another example, an index may track only stocks issued by entities having gross or net sales in excess of a certain dollar amount or that have exhibited positive sales growth compared to the same period in the previous year. Accordingly, a variety of factors may be employed as selection criteria to choose security types or specific securities for representation within a financial instrument. Exemplary selection criteria include, but are not limited to, security type (i.e., stock, bond, put, call, option, future, and so forth), dividend paid, issuing entity revenue, number of employees of issuing entity, trading forum of security (i.e., NASDAQ, NYSE, Chicago Futures Exchange, and so forth), geographic location of issuing entity or headquarters thereof, date of security maturation, presence in another index (such as the Dow Jones Industrial Average), and/or any other datum of a security or security's issuing entity.

It should be noted that selection criteria may be satisfied in a number of ways, depending on the criteria. For example, a first index may use a maximum market capitalization for affiliated entities as a selection criterion. For such an index, the selection criterion represents an upper bound. Accordingly, only securities having fundamental data equal to or less than the selection criterion will be included in the index. A second index, however, may use a minimum dividend paid on a security as a selection criterion. In such an index, the selection criterion is a lower bound, and only securities having a dividend at least equal to the criterion are included in the index. Thus, selection criteria may operate as an upper or lower bound, an exact value, or define a range for a security's fundamental data.

Securities may be chosen for weighting and/or inclusion in an index (or other financial instrument) for many reasons. For example, all securities having a weighting factor exceeding (or beneath) a certain numerical value may be chosen for weighting, or all securities having any non-zero weighting factor may be chosen. As yet another example, securities issued by or representing companies having market capitalizations in excess of a certain amount (for example, 100 million U.S. dollars) may be chosen for weighting.

In a further example, securities traded on a specific exchange or market (such as the New York Stock Exchange (NYSE), American Stock Exchange (AMEX), National Association of Securities Dealers Automated Quotation (NASDAQ) National Market, or a futures exchange such as the Chicago Board of Trade (CBOT)) may be a criterion defining the universe of securities for weighting. Another possible selection criterion may limit weighting of securities to companies incorporated within a certain geographic region, such as the United States of America. As used herein, "incorporated within the United States" includes incorporation in United States territories, such as Puerto Rico. As another example of a selection criterion, securities eligible for weighting may be restricted to those present in a database supplied by one of a variety of database providers, such as REUTERS, S&P COMPUSTAT, VALUE LINE, AAII STOKPAC, and so forth. The database contents may also form the basis for selection criteria, for example restricting securities to those associates with a specific database storing real-time and/or historical data for a given period for companies.

Multiple selection criteria may also be combined to yield a smaller universe of securities for weighting or inclusion in a financial instrument. For example, only securities having a weighting factor exceeding a predetermined value for a certain period of time (for example, revenues of at least 100 million U.S. dollars for each of the past five years) may be weighted or included, as may securities issued by companies having a market capitalization greater than or equal to 100 million U.S. dollars. As another example, only securities traded on a certain exchange and issued by or corresponding to a company having its headquarters within a geographic region may be weighted or included. A specific example of such a combination may be securities traded on the NASDAQ exchange, issued by companies having a headquarters or primary place of business within New York City. Essentially, any combination of selection criteria mentioned herein may be employed to determine securities eligible for weighting or inclusion in the makeup of a financial instrument. Selection is discussed in greater detail below with respect to FIG. 2. It should be understood that the use of "revenues of at least 100 million U.S. dollars for each of the past five years" as selection criteria is exemplary only. Alternative embodiments may vary the minimum revenues required, the time frame for such revenues, or use alternative selection criteria in place of either the minimum revenue or time frame.

Selection of International Stocks and Indices

Indices including, either in whole or in part, securities of affiliated entities incorporated or primarily traded outside the United States may employ selection criteria similar to those discussed above, and employ the various methods for generating primary and secondary indices just described. The specific criteria employed, however, may vary in alternative embodiments of the invention, based on the particular laws and business practices of the country or geographic region involved. For example, as is described in greater detail below, most countries provide different disclosure rules for companies issuing publicly-traded securities compared to those implemented in the United States, resulting in a disclosure level containing potentially different or less useful information than that mandated in the U.S. As a result, some of the criteria-related information noted above, such as quarterly revenue data, may not be readily available for foreign-based affiliated entities. Accordingly, use of different selection criteria from that employed for counterpart U.S. indices may be necessitated.

Additionally, the business environment of a foreign country may also influence the use of different selection criteria. For example, different numbers of large corporations in a particular country may dictate using higher or lower market capitalizations, or higher or lower liquidity requirements, for selection to a particular country- or region-specific index.

For example, a European-based regional index may employ several selection criteria in combination. Exemplary selection criteria may include a positive cash dividend yield over the last year, total cash dividends paid of at least 5 million U.S. dollars in the prior 12 months or in the last fiscal year (as recited in the most recent annual report), and/or an average daily trading volume of at least 100,000 U.S. dollars over the previous three months. In another example, a Japanese index may require a company to be headquartered or incorporated in Japan, trading on the Tokyo Stock Exchange (TSE), Osaka Stock Exchange, or the Japanese Association of Securities Dealers Automated Quotation (JASDAQ) Stock Exchange and paying at least five million U.S. dollars in total cash dividends in the prior twelve months or in the previous fiscal year (as recited in the most recent annual report), to be selected for the index. In both of these specific cases, a selection criterion based on market capitalization may be implemented. For example, component companies to be included in an index may be required to have a market capitalization of at least 100 million U.S. dollars as of a given "screening day." The screening day is the date on which securities are selected for inclusion in an index. Further, exemplary component companies may be required to exist within the universe of "investable securities," as defined by an index calculation agent. One example of an index calculation agent is Dow Jones Indexes, although others exist and would be suitable for defining a universe of investable securities, as well as the companies existing therein. The index calculation agent may additionally perform an ongoing calculation of the components and relative weighting of the stock indices, as well as monitoring corporate actions concerning the component companies contained therein.

In certain embodiments, any or all of the calculations, methodologies, strategies, operations, processes, and/or functions discussed herein (whether relating to selection or weighting) may be performed by the embodiment, a third party, or a user, and may be computer-implemented. For example, any such calculations, methodologies, strategies, operations, processes, and/or functions discussed herein (whether relating to selection or weighting) may be implemented in a hardware or software implementation, and may take the form of computer-readable instructions on a computer-readable medium. Accordingly, such calculations, methodologies, strategies, operations, processes, functions and so forth should be considered to be within the scope of the present invention.

Foreign regional and country alternative indices derived from broad-based primary indices, such as those proposed above for Europe and Japan, may also be developed in a fashion analogous to that described earlier for U.S. securities. For example, the securities of the European broad-based index may be further pared by requiring a market capitalization of at least 100 million U.S. dollars and an average daily trading volume of at least 100,000 U.S. dollars over the previous three months. (It should be understood the exact market capitalization and/or average daily trading volume may vary from embodiment to embodiment. Accordingly, the numbers provided are exemplary rather than limiting; alternative embodiments may use different cutoff values.)

Further, the resulting selections may be ranked based either on the indicated annualized dividend yield or the dividend yield of the trailing twelve month period, with the top 30% of those securities selected forming the basis of a European high-yielding equity index. A Japanese high-yielding equity index, based on the broad-based index proposed above, could be developed using the same method. In alternative embodiments, numerous indices based on other selection criteria, percentages, absolute number of securities, and/or other limits, may be formed in accordance with the above discussion concerning U.S. securities indexes, including indices requiring higher liquidity requirements, minimal market capitalizations and average daily dollar volumes.

Both broad-based and more narrowly focused indices may be developed for each identifiable country or region, including the world as a whole. In addition to Europe (discussed above), other regions, such as Asia, Africa, North America, South America, the Pacific Rim (or the Far East, including, South Korea, Hong Kong, Singapore, and the like), and so on may be selected for region-specific indices. Also, in addition to the United States and Japan, country-specific indices may be created for Australia, South Korea, Taiwan, Singapore, Malaysia, the United Kingdom, France, Germany, Russia, China, India, Canada, Mexico, Brazil, Italy, and many others.

Also, such indices need not be strictly geographically based, but may instead be based on a particular common characteristic that spans geographic boundaries. For example, indices focused on emerging markets or fast-growing companies may be devised according to embodiments of the present invention. In an alternative embodiment, such an index may also be specific to a particular region or country.

Once securities matching certain selection criteria (or a single selection criterion) are determined, the securities may be weighted. A variety of different variables may be used to weight securities in an index or other financial instrument. For reference, such variables are referred to broadly as "weighting factors." Exemplary weighting factors include dividends paid on a security, interest paid on a security, revenues generated by a company or entity securing or issuing a security, profit generated by a company or entity securing or issuing a security (wherein "profit" is defined as revenues less operating expenses), and so on. As previously mentioned, any exemplary fundamental datum may be used as a weighting factor.

Weighting Strategies and Weighting Percentages

In the present embodiment, component securities are weighted in an index by multiplying the chosen weighting factor, time adjusted for the most recent time frame, times the number of common shares (or, in alternative embodiments, "free-float shares" of common stock) outstanding of the security in the most recent time frame to yield a total-weighting factor for the security. For reference and by way of definition, "free-float" shares are shares of a public company freely available to be traded by the public. Further, some forms of common stock may be subject to alienation restrictions, and thus may not be free-float shares. Yet other alternative embodiments may aggregate common shares and free-float shares for use in the herein described weighting strategies. Still other embodiments may weight securities other than common or free-float common shares, such as preferred shares. As used herein, the term "common shares" may embrace limited partnership units, shares of real estate investment trusts, and units of beneficial interest, where such units or shares are applicable to one or more securities in the index.

Continuing with the discussion of the weighting methodology, the total-weighting factor for the security is then divided by the sum of all total-weighting factors for every security in the index, to arrive at a security weighting percentage. The security in question then comprises a portion of the index equal to the security weighting percentage.

Expressed mathematically, the weighting formula is as follows:

$$WP_a = (WF_a) \bigg/ \sum_{n=1}^{m} (WF_n) \tag{1.1}$$

Where, for an index composed of m total securities:
$WP_a$ is the weighting percentage for a particular security a;
$WF_a$ is the time-adjusted weighting factor for security a; and
$WF_n$ is the time-adjusted weighting factor for security n.

As an example, presume an index is sales-weighted. Also presume the total sales of all companies represented in the index is $10 billion. Presuming stock #1 was issued by a company having $300,000,000 in sales within the chosen time frame, stock #1's total weight in the exemplary index is:

(300,000,000)/(10,000,000,000)=0.030, or 3.0%

Thus, stock #1 would compose 3.0% of the exemplary index.

It should be noted that financial instruments may be capped either by a total dollar amount of the instrument or a maximum number of securities held. Thus, the fund in the preceding example may be limited to holding 1000 securities instead of $10,000,000 worth of securities, and the weighting percentage would dictate a number of securities held in the fund, instead of an aggregate security value.

In the present embodiment, the weighting factor is typically sales (revenue) or the annualized dividend per share per security, although other weighting factors may be used.

In another embodiment of the weighting methodology, the weighting percentage for a given security may equal the weighting factor for the security, multiplied by the number of outstanding common or free-float shares of that security, divided by the sum of every security's weighting factor multiplied by the corresponding number of outstanding common or free-float shares. Mathematically, this is simply expressed as:

$$WP_a = (WF_a * S_a) \bigg/ \sum_{n=1}^{m} (WF_n * S_n) \qquad (1.2)$$

Where, for an index composed of m total securities:

$S_a$ is the number of outstanding common or free-float shares of a particular security a;

$S_n$ is the number of outstanding common or free-float shares of security n;

$WP_a$ is the weighting percentage for security a;

$WF_a$ is the time-adjusted weighting factor for security a; and $WF_n$ is the time-adjusted weighting factor for security n.

As an example of index weighting employing methodology 1.2, a dividend-weighted index may be made up of 50 companies that are indicated to pay an aggregate of $10,000,000 in cash dividends on an annualized basis. The weighting percentage for stock #1 in the index having an annualized dividend of $0.75 per share and 1,000,000 common shares outstanding would be:

($0.75)*(1,000,000)/10,000,000=0.075, or 7.5%

In this example, the "indicated aggregate dividend" to be paid of $10,000,000 is calculated by first multiplying the annualized dividend per share of a security by the number of common shares outstanding (or alternatively, the number of free-float shares) for that security. This product, the "indicated cash dividends" to be paid on shares of common stock, is calculated for every stock in the index and then summed, the summation of which is the indicated aggregate dividend to be paid for all the companies included within the index. The indicated aggregate cash dividend may also be termed the "indicated dividend stream" for the stocks constituting the index. The indicated cash dividend for a single security is also referred to as the indicated dividend stream for that security. "Indicated cash dividends" are forward-looking projections of dividends to be paid, as opposed to actual dividends paid in past quarters, years, or other timeframes. In one embodiment, the indicated cash dividend is derived by annualizing the latest quarterly announced cash dividend per share and multiplying that figure by the number of common shares outstanding (or alternatively, the number of free-float shares). Other methods for producing the indicated cash dividend may be employed as well, including annualizing the most recently paid semi-annual dividend per share and multiplying that figure by the number of common shares outstanding (or alternatively, the number of free-float shares). Thus, an index employing the indicated cash dividend as a weighting factor or as the total weighting factor to generate the weighting percentage is a forward-looking index, based on the most current information available.

In yet another embodiment (or in conjunction with foregoing embodiments), the index may be "dividend-yield" weighted, as opposed to being weighted based on indicated cash dividends. In a dividend-yield weighted index, a component's weight in the index, at or around the time of the reconstitution date, is equal to the ratio of its dividend yield divided by the sum all dividend yields for all the components in the index. Dividend yield, for this purpose, can be defined as either the indicated dividend yield or trailing dividend yield, based on dividends paid over the trailing 12 months, or on dividends paid in the company's last annual cycle, depending on the data available in the region that the particular index covers.

As yet another example, a fund may hold only dividend-paying stocks. The fund may include five stocks, with the following annualized dividends per share and outstanding number of common shares:

Stock A pays an annualized dividend of $0.33 per share, and has 10,000 outstanding common shares.

Stock B pays an annualized dividend of $0.50 per share, and has 20,000 outstanding common shares.

Stock C pays an annualized dividend of $1.00 per share, and has 8,000 outstanding common shares.

Stock D pays an annualized dividend of $0.10 per share, and has 50,000 outstanding common shares.

Stock E pays an annualized dividend of $1.20 per share, and has 5,000 outstanding common shares.

Thus, the weighting factor for Stock A is $0.33, the total-weighting factor is 3,300, and the overall percentage of the index made up of Stock A is:

(0.33)*(10,000)/[(0.33)*(10,000)+(0.50)*(20,000)+
(1.0)*(8,000)+(0.10)*(50,000)+(1.20)*(5,000)]=
10.216%

Accordingly, in the present embodiment, Stock A's weighting percentage would be approximately 10.22%. Similarly, Stock B's weighting percentage would be approximately 30.96%, Stock C's weighting percentage would be approximately 24.77%, Stock D's weighting percentage would be approximately 15.48%, and Stock E's weighting percentage would be approximately 18.57%. Accordingly, if the fund totaled ten million dollars, at the close of trading on the day these weights were set, the fund would hold $1,022,000 of Stock A, $3,096,000 of Stock B, and so forth.

Additionally, as previously mentioned, weighting factors or total-weighting factors may be time-based. For example, the weighting factor or total-weighting factor may take the most recent quarter into account, as above in the example basing the weighting factor on a company's total sales. The weighting factor or total-weighting factor may be based on any measurable period of time, such as the past quarter, the past two or three quarters, the past year, the past ten years, and so forth. Further, the time basis for the weighting factor may be an average or median for any period of time, such as an average for the past three years, a weighted average giving more emphasis to a specific time period (such as weighting recent quarters or years more heavily than past quarters or years, perhaps on a declining weighting scale as time passes), and so forth. A rolling average of a specific time period may also be used as the time basis for the weighting factor.

Further, financial instruments may be re-weighted or otherwise rebalanced periodically. For example, the stocks tracked by an index may be re-selected every quarter or at various time intervals. Stocks may be added to or dropped from an index as new stocks meet selection criteria or old stocks fail to meet the same criteria. Similarly, indices or funds may be re-weighted at certain intervals, based on the weighting factors (or total-weighting factors) of each included security at the time of the re-weighting interval.

It should be noted many embodiments of the present invention may employ both of the above-discussed weighting methodologies or formulas under different circumstances. For example, one embodiment of the present invention may weight sales-weighted indices according to methodology 1.1, and weight dividend-weighted indices according to methodology 1.2. Accordingly, a single embodiment may include multiple indices, without requiring every index to use the same weighting methodology.

Weighted Financial Instruments

In addition to indices, various financial instruments may also be weighted. For example, funds (including exchange-traded funds and mutual funds) may be weighted, as may a unit investment trust. Closed-end and open-end registered or unregistered investment companies or commodity pools, securities derived therefrom and/or interests taken therein, and/or options and futures on any such product may also be weighted. Essentially, any financial instrument comprised of multiple securities may be weighted in accordance with the present invention.

Financial Instrument Creation Method

Figure 1:
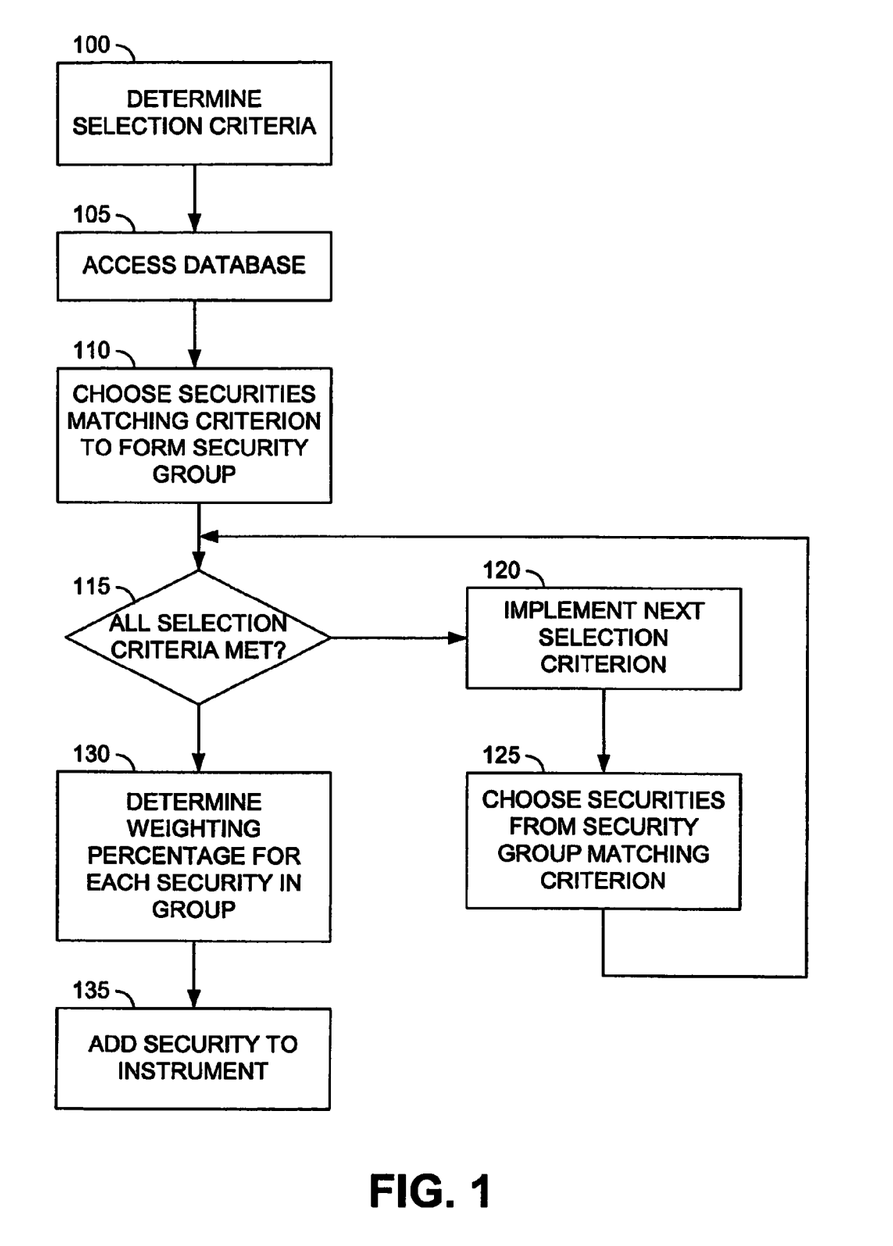
FIG. 1 is a flowchart depicting an exemplary method for weighting a financial instrument.

FIG. 1 is a flowchart depicting a method for creating a financial instrument having weighted securities, through operations of a computer. The operations described with respect to FIGS. 1 and 2 may be carried out on any suitable computing device, including, but not limited to, personal computers, mainframe computers, minicomputers, personal data assistants ("PDAs"), mobile phones, Internet-enabled telephones, laptop computers, computer workstations, Web tablets, wireless devices, network servers, and any other currently available or to be available device(s) capable of executing the below-referenced operations, as set forth by the various embodiments of the present invention described herein. The operations may be carried out at a single location or by a single computing device, or may be carried out by multiple computing devices connected to one another, distributed across, or otherwise capable of transmitting data across a network. Exemplary networks include, but are not limited to, packet switched networks (such as the Internet, intranets, extranets, Ethernets, local area networks (LANs), wide area networks (WANs), and the like), circuit switched networks (such as the "plain old telephone service" (POTS) and some cellular systems), combinations of packet and circuit switched networks, and any other communications topologies configured to facilitate the transmission of data.

The process begins at operation 100, in which one or more selection criteria are determined. As discussed in more detail above and below, the selection criteria are chosen by an operator to determine which specific securities of a securities universe are to be represented in the financial instrument. Exemplary selection criteria are also given above and below.

In operation 105, a database containing entries corresponding to various securities may be accessed. Typically, each database entry includes information such as: a security trading symbol, name, or other identifier; a security price; a state or region in which an entity issuing, securing, or otherwise affiliated with the security ("affiliated entity") has its corporate headquarters or location of business incorporation; the last dividend paid on the security; the dividend yield on that security; the latest dividend per share declared or paid for a security (quarterly, annualized or otherwise); the U.S. dollar value of the dividends paid in the most recent fiscal year for a security; the revenue generated by the affiliated entity within a certain period of time; a market capitalization of the affiliated entity; an average daily U.S. dollar trading volume for the security; a trading exchange for the security; the number of common shares outstanding or free float shares outstanding for a security; and so forth. The database record may include additional information, such as any of the selection criteria, total-weighting factors, or weighting factors discussed herein, or may omit any or all of the information listed.

Further, any one or more of the listed information may be used either as selection criteria, total-weighting factors, or weighting factors.

The database may be provided by any of a variety of data purveyors. For example, the present embodiment employs a customized database provided through FACTSET RESEARCH SYSTEMS. Alternate embodiments may use a database supplied by REUTERS, S&P COMPUTSTAT, THOMSON FINANCIAL, VALUE LINE, and/or AAII STOKPAC. Additionally, database information may be supplemented by an affiliated entity's 10-Q or 10-K filings with the Securities and Exchange Commission. Accordingly, these filings are also considered "databases" for purposes of this document.

In operation 110, securities meeting or exceeding a first selection criterion are selected from the database. These securities form a security group. Presuming only a single selection criterion exists, all securities in the security group will be represented in the financial instrument.

In operation 115, the embodiment determines whether all selection criteria have been considered and compared against the securities in the security group. If so, the embodiment proceeds to operation 130. Otherwise, the embodiment executes operation 120.

In operation 120, the next selection criterion is implemented. Many times, securities may be subjected to analysis against multiple selection criteria. For example, an index may track only stocks paying a dividend and issued by a company having a market capitalization above a certain value. In this example, two selection criteria (dividend and market capitalization) are employed. Other embodiments may employ two, three, or more selection criteria, with only those securities meeting all criteria represented or included in the financial instrument.

In operation 125, securities from the security group established in operation 110 are compared against the selection criterion implemented in operation 120. Those securities matching this additional selection criterion remain in the security group, while securities not meeting the selection criterion are discarded. Effectively, the security group is winnowed to include only those securities matching every selection criterion implemented during operation of the selection process. After operation 125, operation 115 is again executed.

If the embodiment determines in operation 115 that all selection criteria have been considered (and, correspondingly, that all securities remaining in the security group satisfy all selection criteria), then operation 130 is executed. In operation 130, the weighting percentage for each security is determined. The process for determining a security's weighting percentage is discussed in more detail above, in the section entitled "Weighting Strategies and Weighting Percentages."

Finally, in operation 135, the security is added to the financial instrument in the amount dictated by the weighting percentage determined in operation 130. The amount of the security may be measured in either dollar value or shares, depending on the nature of the financial instrument.

The above-described process (or portions thereof) may be implemented at any time, and in some embodiments occurs at regularly timed intervals. For example, an index may be subjected to the above process, or portions of the above process, once per year (as a further example, component companies may be selected as of the close of the last trading day in November for reconstitution on a set date in December) to determine which stocks or securities will be included in the index. Generally speaking, this process is referred to as an "initial selection" the first time a financial instrument is created, and a "reconstitution" when an already-existing financial instrument is again subject to some portion of the process. More specifically, reconstituting refers to the application of the selection criteria to determine which securities remain in, and/or are to be included in, the index. "Reweighting," as used herein, refers to the process of determining each security's weighting percentage within the financial instrument and may occur quarterly, semi-annually or annually at the reconstitution date. Similarly, "rebalancing" refers to adjustments made to an index, often at set intervals such as a quarterly basis, to reflect certain corporate actions, including the issuance or repurchase of common shares outstanding. The exact dates and/or times of any operations described herein, including reweighting, reconstitution, or rebalancing of an index may vary in alternative embodiments.

Alternate embodiments may implement the processes described herein, or portions thereof, for a financial instrument annually, semi-annually, quarterly, weekly, monthly, daily, and so forth. As another example, an index may be reconstituted periodically, for example every January, April, July, and October, to determine which stocks initially selected for inclusion in the index no longer meet the selection criteria and are therefore removed from the index. This reconstitution may operate only on the stocks initially selected to comprise the index, and so may constitute a narrowing or reduction in the number of securities in the index. In such a case, certain operations may be omitted, such as accessing a database in operation 105 and the formation of a security group in operation 110, since the index already constitutes the security group in question.

Alternately, the reconstitution may operate to review all stocks in a database, and thus may act to add stocks that meet the selection criteria as of the rebalancing date. Additionally, some embodiments may vary the reconstitution period depending on the companies or securities included in the index. As an example of such variable reconstitution, dividend-weighted indices containing international companies may be reconstituted annually, dividend-weighted indices containing domestic companies may be reconstituted semi-annually, and sales-weighted indices reconstituted quarterly.

Similar to reconstitution, reweighting the index according to the above-referenced process may occur at any time, or at regular predetermined intervals, such as weekly, monthly, quarterly, annually, and so on. Further, reweighting may occur each time a reconstitution of the index is performed. In alternative embodiments, reweighting may occur more often than reconstitution. For example, an index may be reconstituted annually, such as in December, and reweighted every six months, such as in June and at the next reconstitution in December. In another implementation, the index may be reconstituted and reweighted simultaneously and annually, such as in June.

In some embodiments, the above-referenced process, or portions thereof, may be implemented substantially continuously as market and security data is received. For example, an index value may be calculated during specific time intervals, such as every fifteen seconds, hour, day, month, second, and so forth, as desired. As the index value changes, reflecting changes in the underlying market values of the companies that comprise the index, the weightings for each security typically vary from the weightings that were initially established using the weighting methodologies described herein. These variances generally continue to be affected by changes in market capitalization of the component companies until the next reweighting and/or reconstitution, at which time weightings are re-established using the weighting methodologies described herein.

Although the above process has been described as a set of computer-implemented operations, it should be understood that the process may be carried out manually in order to identify securities for inclusion and weighting in a financial instrument. Accordingly, the present invention embraces both computer-implemented and non-computer-implemented processes for identifying and weighting securities in a financial instrument. It should also be understood that operations of the above-described process may be implemented or executed in an order other than that described without departing from the spirit or scope of the present invention. As one example, the database may be accessed prior to determining all selection criteria Selection Criteria The implementation of various selection criteria for use with embodiments of the invention may now be discussed. In an embodiment employing multiple selection criteria, a set of securities included in an index or similar financial instrument may be chosen to satisfy several different selection criteria. For example, criteria may include a business being incorporated in, or being headquartered in, a particular country, such as the United States, or particular countries within specific continents, such as Europe. Additional selection criteria may require a security to have outstanding common stock trading on a particular stock exchange, such as the NYSE, AMEX or NASDAQ National Market. Further, a positive dividend yield over a specified time period, such as the last three, six or twelve months, and a minimum market capitalization, such as 100 million U.S. dollars, may also serve as sole or joint selection criteria. In alternative embodiments, one, more or fewer selection criteria may be employed, depending on the goals assigned to the particular index involved.

Once a particular set of securities has been selected via one or more selection criteria, the same set of securities may be further apportioned to yield alternative or derivative indices composed solely of those included in the first, or "primary," index. Such an alternative index may be formed by employing one or more selection criteria, which must be satisfied by each security of the primary index, for employment in the alternative index. Further, the basis for the apportionment of the primary index may be a ranking of the securities of the primary index according to one of the original selection criteria (or a completely separate selection criterion). A specified percentage or number of securities chosen from some reference point within the ranked list of securities also may be used to constitute the alternative index.

Figure 2:
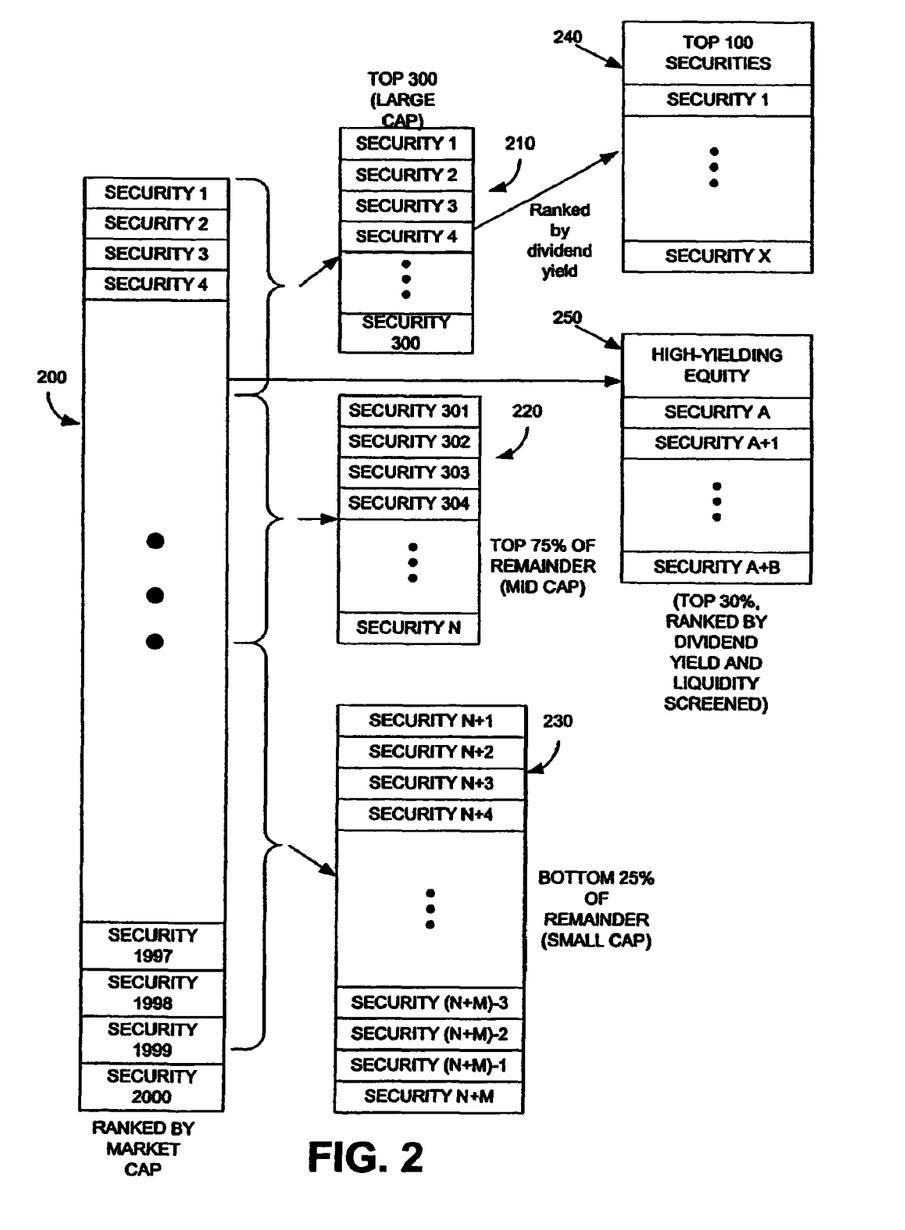
FIG. 2 is a block diagram representing five alternative indices derived from a single primary index using market capitalization and dividend yield as the determining selection factors.

FIG. 2 provides an example of a primary index 200, and five alternative (or derivative) indices 250, 210, 220, 230, 240 derived from the primary index. For example, a primary index 200 of two thousand securities (or any other number of securities), selected by way of one or more selection criteria, may be ranked according to a particular first selection criterion, such as market capitalization. Thus, the primary index may consist of all securities issued by a company having a market capitalization above a certain amount. In the present embodiment, the primary index 200 consists of securities issued by companies having a market capitalization equal to or greater than $100 million. Further, in the present embodiment the primary index 200 includes only securities having a positive dividend yield. Alternate embodiments may include all companies having revenues or profits, or matching any single selection criterion or combination of criteria, regardless of whether the securities pay a dividend.

It should be noted additional selection criteria may be employed to define the primary index. For example, the primary index 200 may consist only of stocks from companies: 1) having a market capitalization exceeding a specific value, as mentioned (the first selection criterion); and 2) incorporated in a specific geographic region (the second selection criterion). Thus, in one exemplary embodiment, a primary index 210 may be constructed from securities issued by or corresponding to a company having a market capitalization of 100 million U.S. dollars or more, and headquartered in the United States. Thus, a security issued by a company having a market capitalization of 350 million U.S. dollars but headquartered in England would not be included in the primary index 200, since the second selection criterion is not satisfied. It should be noted that any of the selection criteria disclosed and discussed herein may be employed to construct the primary index 200.

As also mentioned, the securities in the primary index 200 may be ranked. In one exemplary embodiment, the first selection criterion (or a generalization or extrapolation thereof) is also used to rank the securities. Thus, where the selection criterion is "market capitalization equaling or exceeding 100 million U.S. dollars," the securities in the primary index 200 may be ranked from greatest market capitalization to smallest market capitalization. Presumably, the smallest market capitalization security would be equal to or slightly exceeding $100 million, insofar as the security must also satisfy the selection criterion prior to ranking.

Yet Other Selection Criteria May be Employed

One or more derivative indices may be created from the universe of this ranking, as follows. A first derivative index 250 may be developed by first selecting components from the primary index 200 that satisfy a second selection criterion (or third, in the event two selection criteria were used to create the primary index 200) and, optionally, are in the top of a ranking by yet another selection criterion. Continuing the present example, the securities in the first derivative index may be required to satisfy a defined liquidity requirement as the second selection criterion (i.e., be issued by a company having a daily trading volume of at least 200,000 U.S. dollars per day and a market capitalization of at least 200 million U.S. dollars on the screening day, respectively). Once this liquidity requirement is met, the first derivative index 250 may be developed by selecting a predetermined amount (for example, the top 30%) of the top securities from the primary index 200, after ranking the securities by another selection criterion (here, dividend yield), to form a first derivative index 250. Thus, in the present embodiment the first derivative index 250 includes securities chosen from the primary index 200 that not only have a minimum market capitalization, but also a minimum daily trading volume (liquidity) and are in the top 30% of dividend yields of all securities meeting the market capitalization and minimum daily trading volume criteria.

The predetermined amount of top securities may be expressed either as a set number (such as 600) or a percentage (such as 30%) of the primary index 200. Further, where the predetermined amount is a percentage of the index, the percentage may be based in different embodiments on either the number of securities in the index, or on the aggregate of the selection criterion for all securities in the primary index 200. For example, where the first selection criterion is market capitalization, the predetermined amount of securities selected to form the first derivative index may be a percentage of the total market capitalization of all securities in the primary index 200.

In the present example, this first derivative index 250 may be thought of as an index of securities having a relatively high equity yield, and may be characterized as a high-yielding equity index. Alternate embodiments may form the first derivative index from securities lacking a high dividend yield.

A second derivative index 210 may also be formed from the primary index 200. The second derivative index may represent a number or percentage of securities from the primary index 200. In some embodiments, the second derivative index 210 may be thought of as an index representing the large capitalization segment of the primary index.

In one embodiment, the second derivative index 210 includes the top 300 securities of the primary index 200, as ranked by selection criterion (in the present example, by market capitalization of each company issuing a security, from largest to smallest). Alternative embodiments may vary the size of this first derivative index 210, either by including a different set number of securities therein, or by including a certain top percentage of the ranked securities in the primary index 200.

A certain percentage of the remainder of the ranked securities of the primary index 200 (for example, the remaining securities that equate to the top 75% by market capitalization of the securities remaining in the primary index after the largest 300 companies by market capitalization have been removed) may be chosen to identify a third derivative index 220. A fourth derivative index 230 may be specified by selecting the remainder of the primary index 200 (such as the portion of the index not previously selected for the second 210 or third 220 derivative indices). In the present example, the fourth derivative index includes the securities equating to the bottom 25% of the remaining market capitalization of the primary index, after the largest 300 companies by market capitalization have been removed. In alternative embodiments, numerical or percentage cutoffs may be used to create any or all derivative indices in any number or amount. The percentages used to form the third and fourth derivative indices 220, 230 are typically a percentage of the aggregate market capitalization of the entire primary index 200, after a defined number or percentage of the largest companies by market capitalization have been removed to form second derivative index 210. Alternative embodiments may construct the third and fourth derivative indices by selecting a percentage of the existing number of securities from the primary index 200 before the second derivative index 210 is formed.

For example, the second derivative index may be the top third of all securities in the primary index in some embodiments, the third derivative index the middle third, and the fourth derivative index the bottom third, when ranked according to a particular selection criterion (or criteria). Presume for the sake of this example that a primary index 200 includes 300 stocks with an aggregate market capitalization of $300 billion. In a first embodiment, the second derivative index may include all securities equating to the first $100 billion of market capitalization. That is, the second derivative index 210 would include the securities of the companies having the largest market capitalizations, until an aggregate of $100 billion in market capitalization was represented. The third derivative index would include securities equating to the next $100 billion of market capitalization, and so forth. In such an embodiment, the market capitalization of each derivative index is maintained each time the primary and derivative indices are rebalanced, but the number of securities in each derivative index may vary. The exact percentage cutoffs for each derivative index are exemplary.

Alternative embodiments may base the cutoffs for each derivative index 210, 220, 230 on percentages of the number of securities in the index. Using the previous exemplary primary index 200 with 300 stocks, the second, third, and fourth derivative indices would include 100 stocks each. In such an embodiment, the number of securities in each derivative index is maintained every time the primary and derivative indices are rebalanced, but the aggregate market capitalization of each derivative index may vary.

Alternative selection criteria, other than market capitalization, may be used when determining the size of each derivative index 210, 220, 230. It should further be noted that multiple selection criteria may be employed to constitute the primary index 200 and the derivative indices 250, 210, 220, 230. Finally, it should be noted that a different selection criterion (or criteria) may be employed to constitute any or all of the derivative indices. The selection criterion or criteria may be any of the previously-discussed fundamental data.

Using market capitalization as the discerning criteria, in this case, could thus identify the second index 210, third 220 and fourth 230 derivative indices as large capitalization ("large cap") 210, middle capitalization ("mid cap") 220 and small capitalization ("small cap") 230 indices.

In another embodiment, a percentage based from some reference point may be employed to select a first derivative index, with an absolute number employed thereafter to generate other derivative indices. Further, only percentages of a list of securities of a primary index that has been ranked based on one or more selection criteria may be employed. Similarly, absolute numbers from the top, bottom, or some other reference point of a ranked list of securities may be employed.

Further, the securities surviving the additional selection criteria may be ranked according to one or more selection criteria, and then a percentage or absolute number of the surviving securities based on a particular reference point may be selected to generate a derivative index. For example, the surviving securities may be ranked in descending order by "indicated dividend yield" or "trailing dividend yield" and then the top 30%, or some other measure of the top surviving securities (as ranked) may be selected for a derivative or secondary index. As employed in relation to some embodiments of the present invention, the indicated dividend yield of a security is defined as an annualization of the most recent declared dividend per share, divided by the closing stock price on the screening day for the annual reconstitution. In some embodiments, or for certain securities, the indicated dividend yield of a security is an annualization of the most recent declared dividend per share on the "ex-dividend date," divided by the closing price on the screening day for the annual reconstitution. The ex-dividend date is defined as the date on which the buyer of a stock is no longer able to purchase the stock through a regular transaction and still receive a specified dividend payment. The screening day is the date on which securities are selected for inclusion in an index and before an actual reconstitution date. In turn, the reconstitution date is defined as the date on which new index components and index weightings go into effect. Employing the indicated dividend yield as a selection criterion may produce an index containing higher dividend-yielding securities than those selected for the primary index. Indicated dividend yield may be utilized as a selection criterion, a weighting factor, or both, in any of the embodiments of the invention described herein. In addition, selection criteria and weighting factors other than the indicated dividend yield, as described herein, may also be similarly employed. For example, a "current dividend yield" could be used as a selection and/or weighting factor, as well as a total-weighting factor. The current dividend yield for a security is calculated by summing the last two quarterly dividend per share payments and adding to that sum the next two projected quarterly dividend per share payments, based on the annualized indicated dividend per share rate, and then dividing that sum by the closing stock price on the screening day for the annual reconstitution. Moreover, a "trailing dividend yield" could be used as the selection and/or weighting factor. A security's trailing dividend yield is calculated by summing the last four quarterly dividend per share payments (or two payments, in the case of semi-annual payers, or last payment in the case of annual payers) and dividing that sum by the closing stock price on the screening day for the annual reconstitution.

Still other derivative indices may be created. For example, a fifth derivative index 240 may include the top 100 securities of the large capitalization index 210, as ranked by a different selection criterion than that used to create the primary index 200 (in the present example, by highest dividend yield). Alternative embodiments may vary the size of this fifth derivative index 240, either by including a different set number of securities therein, or by including a certain top percentage of the ranked securities in the large capitalization index 210. It should be noted the fifth derivative index 240 is created from the second derivative index 210, and thus is subject to any selection criteria used to form the second derivative index 210. Accordingly, in the present embodiment, the fifth derivative index 240 includes the 100 securities from the second derivative index 210 having the highest dividend yield.

Moreover, in its current embodiment index 240 is weighted using the indicated dividend yield weighting methodology described above, although in other embodiments it could be weighted by indicated cash dividends, or by current or trailing dividend yield. Any of the derivative indices herein may be weighted using any of the weighting methodologies discussed, or may be equal-weighted.

In another embodiment, current dividend per share or trailing dividend per share could be used as the weighting factor that is multiplied by common shares outstanding (or alternatively, the number of free-float shares) for each component to create the total weighting factor used to set percentage weights for each index component on the reconstitution date.

The securities selected for derivative indices may also form the bases of indices containing more or fewer securities, based on the tenets described above.

As one example, employing the selection and weighting methodology described above may create a broad-based dividend-weighted dividend index 200 including every investable dividend-paying security meeting the desired selection criterion or criteria. Such a broad-based dividend index, and the subsets derived from it described below, may be created for securities trading in any country or region of the world containing such investable dividend-paying securities. This selection and weighting methodology, used separately or in tandem, may create benchmark dividend indexes that may be used by investors to better evaluate investment opportunities presented by the dividend-paying segments within and among different stock markets.

Similarly, a derivative index 250 may correspond to a high-yielding subset of the broad-based index 200, and include the top 30% of the companies ranked by dividend yield above a defined market capitalization.

Continuing the example, the second derivative index 210 would correspond to a large capitalization subset of the broad-based index 200 and may include the 300 largest companies ranked by market capitalization.

The third derivative index 220 in this example generally corresponds to a mid-capitalization subset of index 200 and typically holds those companies whose market capitalizations are in the top 75% of the remaining market capitalization of the broad-based index 200 after the 300 largest companies by market capitalization are removed.

Index 230 would be the small-capitalization sub-set of index 200 and would be comprised of those companies whose market capitalizations totaled the bottom 25% of the remaining market capitalization of Index 200 after the 300 largest companies by market capitalization has been removed.

As another example of selecting a set number of ranked companies or securities from within the broad-based index, a further index 240 may constitute the top 100 companies ranked by highest dividend yield from the 300 large-capitalization companies selected to form Index 210, and then weighted by dividend yield as described above.

It should generally be noted that certain derivative indices depicted on FIG. 2, such as the first, third, fourth, and fifth indices 250, 220, 230, 240, depict a list of securities contained therein as starting or ending with an arbitrarily-labeled security (for example, "Security N" or "Security A+B"). This reflects the fact that the exact securities in each derivative index are determined by the selection criteria and methodology disclosed herein. For example, although the third derivative index 220 generally begins with security 301, it does not necessarily end with a particular security number, since the index 220 represents 75% of the total market capitalization of the primary index 200 after the top 300 securities have been removed. Thus, the number of securities and labeling of the securities shown in the derivative indices is illustrative only.

Exemplary Indices

An exemplary market capitalization-weighted index is presented herein. This market capitalization-weighted index is provided by way of illustration and not limitation; alternate embodiments may employ indices having different weighting factors, or including a different universe of securities. A table summarizing the exemplary index is provided, below.

TABLE 1

Market Capitalization Weighted Index

| Company Symbol | Company Name | Market Cap ($mil.) | % Weight in a Market-Cap Weighted Index |
|---|---|---|---|
| GE | General Electric Co. | 360,721.20 | 10.52% |
| XOM | Exxon Mobil Corp. | 317,532.70 | 9.26% |
| MSFT | Microsoft Corp. | 303,894.00 | 8.87% |
| C | Citigroup Inc. | 230,269.20 | 6.72% |
| WMT | Wal-Mart Stores Inc. | 228,756.20 | 6.67% |
| PFE | Pfizer Inc. | 218,022.20 | 6.36% |
| BAC | Bank of America Corp. | 181,357.50 | 5.29% |
| JNJ | Johnson & Johnson | 173,296.40 | 5.06% |
| AIG | American International Group Inc. | 158,184.20 | 4.61% |
| IBM | International Business Machines Corp. | 149,406.60 | 4.36% |
| INTC | Intel Corp. | 140,750.00 | 4.11% |
| JPM | JPMorgan Chase & Co. | 137,573.10 | 4.01% |
| PG | Procter & Gamble Co. | 129,828.30 | 3.79% |
| CVX | ChevronTexaco Corp. | 112,413.56 | 3.28% |
| VZ | Verizon Communications | 108,266.25 | 3.16% |
| WFC | Wells Fargo & Co. | 100,947.04 | 2.94% |
| MO | Altria Group Inc. | 99,458.58 | 2.90% |
| KO | Coca-Cola Co. | 98,241.88 | 2.87% |
| HD | Home Depot Inc. | 90,129.52 | 2.63% |
| UPS | United Parcel Service Inc. | 88,760.78 | 2.59% |
| Total | | 3,427,809.21 | 100.00% |

The above table illustrates an index comprising the 20 largest publicly traded companies, as of Oct. 31, 2004, weighted by market capitalization, using the weighting methodologies discussed herein. For example, General Electric Company's ("GE") market capitalization is $360,721.20 million. Thus, GE's weight in the exemplary index shown in Table 1 would be its market capitalization divided by the sum of the market capitalizations for all companies in the index, or:

360,721.2/3,427,809.21=10.52%

Table 2 depicts a second exemplary index. This index includes the same companies, but employs a dividend-weighting methodology.

TABLE 2

Dividend-Weighted Index

| Company Symbol | Company Name | Indicated Cash Dividends To be Paid ($mil.) | % Weight in a Dividend Weighted Index |
|---|---|---|---|
| GE | General Electric Co. | 8,457.71 | 11.00% |
| XOM | Exxon Mobil Corp. | 6,967.40 | 9.06% |
| MSFT | Microsoft Corp. | 3,476.80 | 4.52% |
| C | Citigroup Inc. | 8,303.60 | 10.80% |
| WMT | Wal-Mart Stores Inc. | 2,206.11 | 2.87% |
| PFE | Pfizer Inc. | 5,121.08 | 6.66% |
| BAC | Bank of America Corp. | 7,288.31 | 9.48% |
| JNJ | Johnson & Johnson | 3,384.00 | 4.40% |
| AIG | American International Group Inc. | 781.67 | 1.02% |
| IBM | International Business Machines Corp. | 1,198.58 | 1.56% |
| INTC | Intel Corp. | 1,011.68 | 1.32% |
| JPM | JPMorgan Chase & Co. | 4,847.14 | 6.30% |
| PG | Procter & Gamble Co. | 2,536.70 | 3.30% |
| CVX | Chevron Texaco Corp. | 3,389.78 | 4.41% |
| VZ | Verizon Communications | 4,264.20 | 5.55% |
| WFC | Wells Fargo & Co. | 3,245.45 | 4.22% |
| MO | Altria Group Inc. | 5,992.96 | 7.79% |
| KO | Coca-Cola Co. | 2,416.18 | 3.14% |
| HD | Home Depot Inc. | 745.96 | 0.97% |
| UPS | United Parcel Service Inc. | 1,255.52 | 1.63% |
| Total | | 76,890.80 | 100.00% |

As shown, the weighting for each stock differs from the weighting shown in Table 1. As an example, consider GE again. Here, GE's indicated cash dividends to be paid on shares of outstanding common stock in the upcoming year is $8,457.71 million, and the indicated aggregate dividend for all companies in the index is $76,890.80 million. Accordingly, GE occupies 11.00% of the index:

8,457.71/76,890.80=11.00%

It should be noted that the weightings for other companies change more dramatically in a dividend-weighted index. For example, Microsoft's (MSFT) weighting may decrease and Citigroup's (C) weighting increase in a dividend-weighted index, compared to their respective weightings in a market-cap weighted index. This can be seen by comparing the relative percentages of MSFT and C in Table 1 versus the relative percentages for the same stocks in Table 2. Dividend-weighting, using the methodology described herein, may give investors an opportunity to own the "dividend stream," as defined herein, of a defined group of component companies in the exact proportion to the aggregate cash dividends that those component companies are projected to pay in the coming year on shares of outstanding common or free-float stock. A trailing dividend stream may be calculated by summing the quarterly dividends per share paid in the preceding four quarters and multiplying the summed dividend by the number of outstanding common shares, or in the case of foreign-based companies, by calculating the total dividends paid on all outstanding shares of common stock in the most recent fiscal year, or in the most recent 12-month period.

The dividend stream may be calculated for any group of companies, such as those constituting an index focused on a particular country or region. For example, summing the trailing dividend stream for all investable securities in Japan would represent Japan's overall trailing dividend stream. Further, employing all known investable dividend-paying companies for such a calculation would produce the world's dividend stream. Creating an index, using companies chosen by means consistent with the selection methodology defined above, and weighting these corresponding securities in relation to their share of the world's dividend stream, would form the basis for a world dividend index. Similarly, employing all known investable dividend-paying companies that trade on stock exchanges outside the United State for such a calculation may produce an international dividend stream. Creating an index, using companies chosen by means consistent with the selection methodology defined above, and weighting these corresponding securities in relation to their share of the international dividend stream, may form the basis for an international dividend index. All such indexes created in this way could be further subdivided into the five derivative indexes described above.

In addition, the value of the dividend stream may also be utilized to provide an indication of the aggregate pricing of a group of securities relative to the dividends paid by the group, termed the "dividend multiple." One possible method for calculating the dividend multiple for a specific group of companies may be to add the market capitalization for each of the companies together, and divide the sum by the dividend stream for the group, as described above. Again, the group of companies selected may be specific to a country, region, or some other parameter. In addition, calculating the dividend multiple across all dividend-paying companies worldwide would thus result in a world dividend multiple. This calculation methodology, used separately or in tandem, would create dividend ratios that could be used by investors to better evaluate the investment opportunities presented by the dividend-paying segments within and among different stock markets.

Generally, the primary index 200 may be weighted by dividend stream, as may any of the derivative indices.

It should generally be noted with respect to the various indices and/or weighting methodologies discussed herein that rounding weights and/or positions may prove useful. In the present example, positions in the exemplary indices are rounded to the nearest hundredth of a percent. Alternate embodiments may round to the nearest tenth of a percent or whole percentage point, or any other convenient point.

Weighting of International Stocks and Indices

In some embodiments, international stocks may be weighted slightly differently than domestic stocks for inclusion in an index. Typically, financial reporting is handled differently by foreign companies, due to differing foreign laws, and generally results in a less "transparent" view of a company. That is, foreign companies often are not required to (and do not) release data reported by U.S.-based companies, or if they do so, do not do so as frequently as is required in the United States. For example, many foreign companies do not report quarterly revenue or dividend data.

Accordingly, and particularly with respect to a dividend-weighted index, different fundamental data may be employed to weight international stocks in an index employing a weighting methodology discussed herein. In some embodiments, including the present embodiment, international stocks are weighted in a dividend index by using the international stock's total cash dividends paid on the company's common stock during the most recent fiscal year as the weighting factor. Generally, this total cash dividend is converted to United States dollars in order to maintain a common baseline for all stocks' weighting factors. The conversion typically takes place at the exchange rate at the time of the company's financial reporting.

It should be noted that certain indices may include both international and domestic stocks. In such cases, one weighting factor (or total-weighting factor) may be used for the international stocks and a second for the domestic stocks, or both may use a common weighting factor (typically the weighting factor employed for the international stock). Where two unique weighting factors are employed, one for international and one for domestic stocks, the two weighting factors are nonetheless aggregated in order to determine the percentages of each stock in the index.

An example may aid understanding. Presume two stocks are included in a dividend-weighted index. Stock A is a domestic (United States) stock, issued by a company which paid $1 million in cash dividends on shares of common stock last year and is projected to pay $1.2 million in indicated annual dividends for the upcoming year. Stock B is an international stock, issued by a company which paid $1.5 million in cash dividends on shares of its common stock in its most recently reported fiscal year and has not enough available information to calculate indicated annual dividends. Stock A's weighted percentage of the index is:

1,200,000/(1,200,000+1,500,000)=44.44%

Similarly, Stock B's weighted percentage of the index is:

1,500,000/(1,200,000+1,500,000)=55.56%

Thus, it can be seen the weighting factor for Stock A is the indicated annual cash dividend to be paid (i.e., the forward-looking number), but for Stock B the weighting factor is the prior annual dividend paid (i.e., the backward-looking number). This is but one example of a method for weighting an index containing both international and domestic stocks. As international financial reporting becomes more standardized and transparent, it may become possible to weight all components of a combined U.S. and international index by indicated cash dividends, denominated in U.S. dollars. Alternate methods embraced by the spirit and scope of the present invention will be recognized by those of ordinary skill in the art upon reading the present disclosure.

CONCLUSION

Although various embodiments of this invention have been described above with a certain degree of particularity or with reference to one or more individual embodiments, those skilled in the art could make numerous alterations to the disclosed embodiments without departing from the spirit or scope of this invention. For example, an alternate embodiment of the present invention may employ selection criteria or weighting factors other than those mentioned herein, such as percentage increase in security value across a certain time. Accordingly, all matter contained in the above description and shown in the accompanying figure are illustrative of particular embodiments, rather than limiting. Changes in detail or structure of the various embodiments and processes described herein may be made without departing from the basic elements of the invention as defined in the following claims.

We claim:

1. A non-transitory computer-readable medium having stored thereon computer-readable instructions for implementing a method for constructing a financial instrument, comprising the operations:

selecting a universe of securities satisfying a first and second selection criterion; ranking the universe of securities by the first selection criterion; wherein the first selection criterion is a market capitalization; the second selection criterion is a positive dividend yield; and each of the plurality of securities is associated with an affiliated entity;

selecting a top number of the universe of securities, as ranked, to form a first plurality of securities;

constructing a first derivative index from the first plurality of securities;

providing information based on the first derivative index to an entity for constructing a financial instrument based on the first derivative index;

selecting a first percentage of a portion of the universe of securities, as ranked, to form a second plurality of securities;

constructing a second derivative index from the second plurality of securities; wherein the portion of the universe of securities excludes the first plurality of securities;

the second plurality of securities does not overlap the first plurality of securities; and providing information based on the second derivative index to the entity for constructing a financial instrument based on the second derivative index.

2. The computer-readable medium of claim 1, wherein the top number of the universe of securities is three hundred.

3. The computer-readable medium of claim 1, wherein: the first percentage of the universe is the top 75%, by ranking, of the universe excluding the first plurality of securities.

4. The computer-readable medium of claim 3, further comprising:
selecting a second percentage of the universe of securities, as ranked, to form a third plurality of securities;
constructing a third derivative index from third plurality of securities; wherein
the third plurality of securities excludes both the first and second plurality of securities; and
providing information based on the third derivative index to the entity for constructing the financial instrument based on the third derivative index.

5. The computer-readable medium of claim 4, wherein: the second percentage of the universe is the bottom 25%, by ranking, of the universe excluding the first plurality of securities.

6. The computer-readable medium of claim 4, further comprising:
ranking the first plurality of securities by a third selection criterion;
selecting a fourth plurality of securities from the first plurality of securities, the fourth plurality of securities comprising less than the whole of the first plurality of securities;
constructing a fourth derivative index from the fourth plurality of securities; wherein
selection of the fourth plurality of securities from the first plurality of securities is based on the ranking of the first plurality of securities; and
providing information based on the fourth derivative index to an entity for constructing the financial instrument based on the fourth derivative index.

7. The computer-readable medium of claim 6, wherein: the third selection criterion is a dividend yield; and the fourth plurality of securities comprises the top one hundred securities of the first plurality of securities, as ranked by dividend yield.

8. The computer-readable medium of claim 6, further comprising weighting the fourth derivative index by an indicated dividend yield.

9. The computer-readable medium of claim 7, further comprising:
screening the universe of securities by a fourth selection criterion;
ranking the universe of securities by a fifth selection criterion;
creating a fifth plurality of securities comprising those securities in the universe meeting the fifth selection criterion and passing the screening; and
forming a fifth derivative index from the fifth plurality of securities; and
providing information based on the fifth derivative index to the entity for constructing the financial instrument based on the fifth derivative index.

10. The computer-readable medium of claim 9, wherein:
each of the fourth plurality of securities is associated with an affiliated entity;
the fourth selection criterion comprises a minimum liquidity for the affiliated entity;
the fifth selection criterion comprises an indicated dividend yield;
the minimum liquidity comprises at least 200 million U.S. dollars and at least 200,000 U.S. dollars in daily trading volume during a prior three months for the affiliated entity.

11. The computer-readable medium of claim 10, wherein:
the operation of forming the fifth derivative index from the fifth plurality of securities comprises:
choosing a top amount of the fifth plurality of securities; and
forming the fifth derivative index from the top amount of the fifth plurality of securities; and
providing information based on the fifth derivative index to the entity for constructing the financial instrument based on the fifth derivative index.

12. The computer-readable medium of claim 11, wherein the top amount is thirty percent.

13. The computer-readable medium of claim 1, wherein the second selection criterion further comprises one of the group consisting of:
a non-zero dividend yield over a first period of time;
a business headquartered in a specified geographic region;
a business incorporated in a specified geographic region
trading of the universe of securities on a specified stock exchange;
a minimum average daily trading volume over a second period of time;
a total cash dividends paid over a third period of time);
a minimum indicated cash dividend; and
an indicated dividend yield, chosen from the group comprising: an actual indicated dividend yield; and an estimated indicated dividend yield.

14. The computer-readable medium of claim 1, wherein the selecting operation comprises:
determining a cash dividend per share over a previous time period for each of the plurality of securities;
annualizing the cash dividend per share for each of the plurality of securities; and
dividing the annualized cash dividend per share for each of the plurality of securities by the share price of the corresponding security.

15. The computer-readable medium of claim 1, further comprising the operations of:
- calculating an indicated cash dividend for each security in the universe;
- calculating an aggregate cash dividend by summing the indicated cash dividends of all securities in the universe;
- dividing the indicated cash dividend for at least a first security by the aggregate cash dividend to yield a weighting percentage for the first security; and
- filling a percentage of the universe with the first security; wherein
- the percentage of the universe equals the weighting percentage for the first security.

16. The computer-readable medium of claim 1, further comprising the operations of:
- weighting each security in the universe of securities in proportion to each security's cash dividends paid in a prior period divided by an aggregate of all security's cash dividends paid in the prior period.

17. The computer-readable medium of claim 1, further comprising:
- determining a dividend stream for each security in the universe of securities; and
- ranking the universe of securities by placing each security in the universe in order, from highest dividend stream to lowest.

18. The computer-readable medium of claim 17, wherein the step of determining a dividend stream for each security in the universe of securities comprises a sum of all cash dividends paid on the security by an affiliated entity, expressed in a common currency.

19. The computer-readable medium of claim 17, wherein:
- each security is one of a common stock or a real estate investment trust; and
- the step of determining a dividend stream for each security in the universe of securities comprises:
  - annualizing a latest declared cash dividend for a share of the security;
  - multiplying the annualized declared cash dividend for the share by a number of outstanding shares of the security.

20. The computer-readable medium of claim 18 or 19, further comprising:
- summing a market capitalization for each security in the universe to yield an aggregate market capitalization;
- summing the dividend stream for all securities in the universe to yield an aggregate dividend stream; and
- dividing the aggregate market capitalization by the aggregate dividend stream to yield a dividend multiple.

21. The computer-readable medium of claim 1, further comprising:
- calculating an indicated cash dividend for each security in the universe;
- calculating an aggregate dividend stream by summing the indicated cash dividends for each security;
- dividing each security's indicated dividend stream by the aggregate cash dividend to create a respective weighting percentage for each security; and
- representing each security in the universe in a percentage equal to each security's respective weighting percentage.

* * * * *